(No Model.)
O. COOLEY.
CHAIN BELT TIGHTENER.
No. 339,861. Patented Apr. 13, 1886.
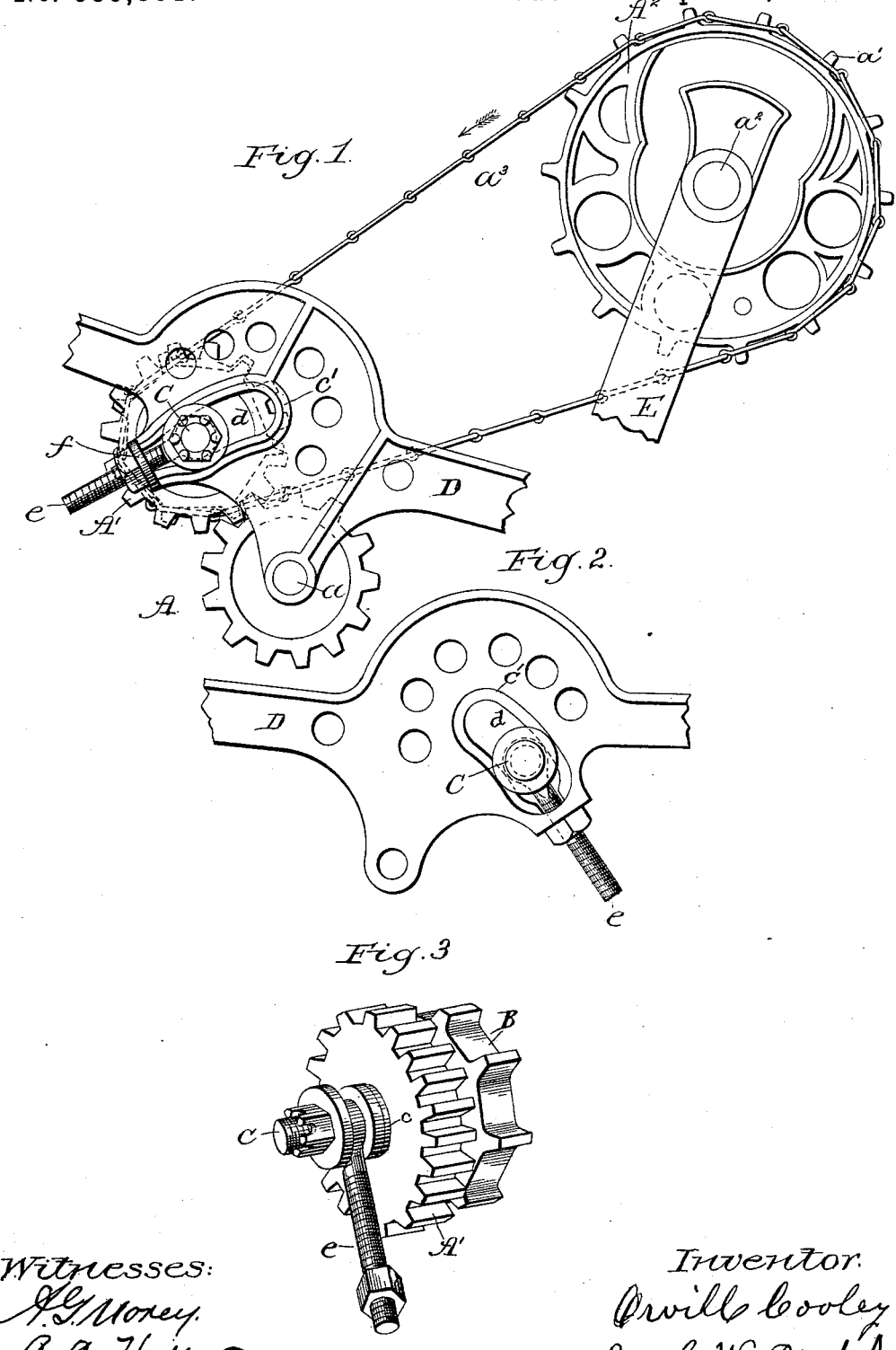
Witnesses:
N. G. Morey.
R. C. Hull
Inventor:
Orville Cooley
By J. W. Ford Atty.

UNITED STATES PATENT OFFICE.

ORVILLE COOLEY, OF BATAVIA, NEW YORK, ASSIGNOR TO THE JOHNSTON HARVESTER COMPANY, OF SAME PLACE.

CHAIN-BELT TIGHTENER.

SPECIFICATION forming part of Letters Patent No. 339,861, dated April 13, 1886.

Application filed January 27, 1886. Serial No. 189,984. (No model.)

*To all whom it may concern:*

Be it known that I, ORVILLE COOLEY, a citizen of the United States, residing at Batavia, in the county of Genesee and State of New York, have invented a new and useful Chain-Belt Tightener, of which the following is a specification.

My invention relates to improvements in tighteners for belts or operating-chains when used for driving machinery, and in this instance is shown in connection with a portion of the binding mechanism of a grain-harvesting machine of the "Appleby" type; and the objects of the improvements are, first, to provide a simple device for taking up the slack of a belt or chain as it shall become stretched by use, thereby keeping it in a strained position; and, second, to be able to dispense with the usual tightening-pulley, and yet secure the proper tension of the belt or chain. I attain these objects by the mechanism illustrated in the accompanying drawings, in which—

Figure 1 is an inner face view of the tightener in working position. Fig. 2 is a reverse face view of a section of the pinion-bearing iron, showing the adjusting-slot and tightening-eyebolt in position; and Fig. 3 is a perspective view of the movable pinion and sprocket-wheel mounted upon the supporting-stud, but removed from the slotted bearing-iron.

Similar letters refer to similar parts throughout the several views.

A is the driving-pinion, loosely mounted (when at work) upon a continuously-revolving shaft, $a$.

A' is the sliding pinion, permanently secured to the small driving sprocket-wheel B, both of which are made to revolve upon the stud C.

A² represents a cam-wheel that is used upon the Appleby knotter, to which this device and coacting parts may be applicable, the said wheel being provided with peripheral teeth $a'$, which engage with the open-link sprocket-chain $a^3$, and by which the same is driven. This cam-wheel is mounted upon the knotter-driving shaft $a^2$ and supported by the arm E, in the usual manner.

$d$ is a slot for the chain-tightening bolt, made in the supporting-arm D in the arc of a circle, of which the middle of the gear-wheel A is the center, so that as the sliding pinion A', mounted upon the stud C, moves within the slot, for regulating the tension of the chain, the teeth of the gear-wheels will at all times remain in mesh.

The stud C, upon which the pinion A' turns, is provided with a flange, $c$, against one side of which the said pinion abuts. The other side of this flange enters within a recess or rabbet, $c'$, made in the iron D upon the outer face, as shown in Fig. 2, and extending laterally from either edge of the slot, and of a depth corresponding with the thickness of the flange, so that when the flanged stud is screwed up against the recessed portion (by means of the screw-thread upon the stud and the corresponding nut, the face of which rests against the reverse side of the iron D and reaching upon either side of the slot) the pinions A A' will have the face of each in line longitudinally.

$e$ is an eyebolt, the stem of which passes through the ear $f$ upon the outer end of the slot $d$. This eyebolt, with its screw-threaded stem, (nearly the entire length,) is as long as the slot, and carries upon said stem a corresponding screw-nut, for a purpose which will presently appear. The eye portion of this bolt is made of about the same thickness as the iron contiguous to the slot, and of a diameter not greater than the width of the said slot, so that it can be moved therein.

When in operative position, the screw end of the flanged stud, carrying the pinion A' and the small sprocket-wheel, passes through the eye of the bolt $e$, the flange entering within the recess, the nut upon the opposite side thereof, and made to impinge against the face of the slotted iron upon the reverse side of the recess. Now, when it is desired to tighten the chain, the nut of the eyebolt (carrying the stud upon which the pinion and sprocket-wheel turns) is screwed upon the stem of the eyebolt and against the face of the ear through which the stem passes, so that the small sprocket-wheel is drawn away from the large sprocket-wheel, thus increasing the distance between the wheels, with the consequent tightening of the chain which passes around the wheels and upon the periphery of the same. When the desired tension is had, the nut upon the flanged stud is screwed down against the face of the slotted iron, and the whole is made secure.

It will be observed that the tightener can be used in connection with any kind of driving chain or belt wherein the power is distributed through the intervention of gear-wheels; hence I do not wish to confine myself to the specific device shown.

Having now described my invention, what I claim as new, and desire to secure by Letters Patent, is—

1. The combination of the sprocket-tooth cam-wheel, the sprocket-chain, the small sprocket-wheel secured to the pinion, the flanged stud carrying the securing-nut, and the circularly-slotted supporting-iron, substantially as described.

2. The combination of the sprocket-wheels, the sprocket-chain, the flanged stud carrying the stud-securing nut, the circularly-slotted supporting-iron, and the eyebolt carrying the tightening-nut, substantially as described.

3. The combination of the circularly-slotted iron having the recess $c'$, the stud C, carrying the securing-nut and having the flange $c$, the eyebolt having the nut thereupon, and the ear $f$, substantially as described.

ORVILLE COOLEY.

Witnesses:
WM. M. STOWELL,
G. W. FORD.